(12) United States Patent
Schexnayder et al.

(10) Patent No.: US 8,382,139 B2
(45) Date of Patent: Feb. 26, 2013

(54) TORSION SEAT-HANDLE TO FACILITATE LEARNING BICYCLE RIDING

(76) Inventors: Damian Schexnayder, Hillsboro, OR (US); Mohamed Elgamal, Beaverton, OR (US); James Duncans, Aloha, OR (US)

( * ) Notice: Subject to any disclaimer, the term of this patent is extended or adjusted under 35 U.S.C. 154(b) by 0 days.

(21) Appl. No.: 13/099,256

(22) Filed: May 2, 2011

(65) Prior Publication Data

US 2012/0280471 A1    Nov. 8, 2012

(51) Int. Cl.
*B62H 7/00* (2006.01)
(52) U.S. Cl. .................... 280/293; 297/183.1; 297/215.1
(58) Field of Classification Search .................. 280/293, 280/304.5, 755; D12/114; 16/421, 422, 16/429, 114; 297/215, 215.1, 215.12, 215.11, 297/183.1, 183.4, 183.6, 183.7, 183.8, 196
See application file for complete search history.

(56) References Cited

U.S. PATENT DOCUMENTS

| | | | | |
|---|---|---|---|---|
| 1,041,087 | A * | 10/1912 | Howard | 297/211 |
| 1,330,934 | A * | 2/1920 | Speer | 236/34.5 |
| 1,367,981 | A * | 2/1921 | Lawrence | 297/373 |
| 2,494,519 | A * | 1/1950 | Persons | 297/210 |
| 2,519,027 | A * | 8/1950 | Disney et al. | 297/183.9 |
| 4,363,516 | A * | 12/1982 | Braly et al. | 297/215.1 |
| 4,768,826 | A * | 9/1988 | Kashima | 297/195.1 |
| 5,259,638 | A * | 11/1993 | Krauss et al. | 280/293 |
| 5,303,944 | A * | 4/1994 | Kalmus | 280/288.4 |
| 5,501,479 | A * | 3/1996 | Fehrenbach et al. | 280/293 |
| 6,149,178 | A * | 11/2000 | Bradbury et al. | 280/293 |
| 6,155,620 | A * | 12/2000 | Armstrong | 294/57 |
| 6,398,248 | B1 * | 6/2002 | Dodson | 280/293 |
| 6,935,649 | B2 * | 8/2005 | Lim | 280/278 |
| 2002/0096858 | A1 * | 7/2002 | Shaw | 280/293 |
| 2003/0168829 | A1 * | 9/2003 | Merrill | 280/293 |

* cited by examiner

*Primary Examiner* — Anne Marie M Boehler
(74) *Attorney, Agent, or Firm* — Mark S. Hubert

(57) ABSTRACT

A bicycle riding training device, or torsion seat-handle, attaches directly to the seat frame of a bicycle allowing the rider to receive immediate physical feedback from the instructor. The rider can "feel" the instructor's corrections through the seat, allowing the rider to more quickly learn how to balance the bicycle. The torsion seat-handle extends rearwardly and upwardly from the seat of the bicycle, such that it may be grasped by an instructor to provide physical corrections the rider. Additionally, the angular deployment of the torsion seat-handle can be adjusted to account for the height of the instructor.

6 Claims, 5 Drawing Sheets

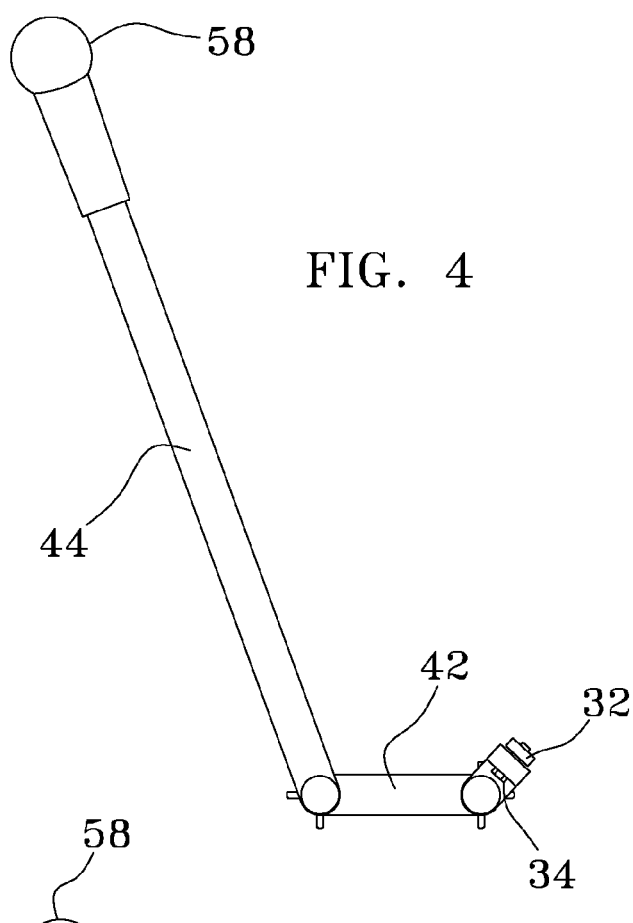
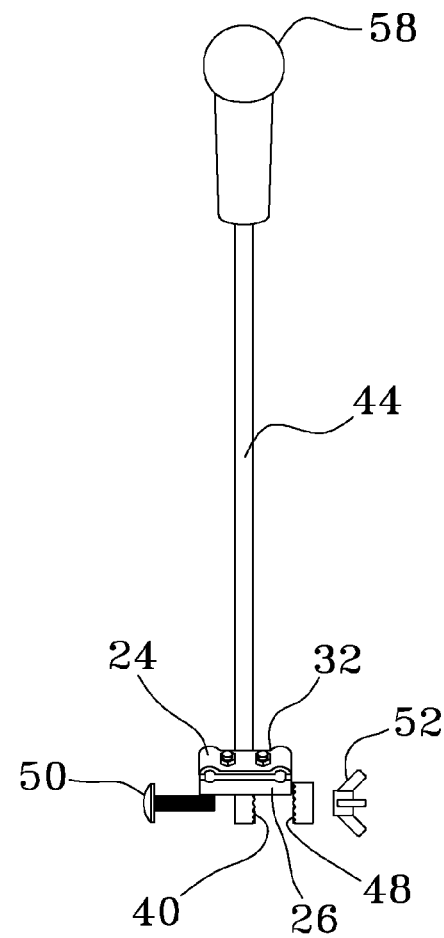
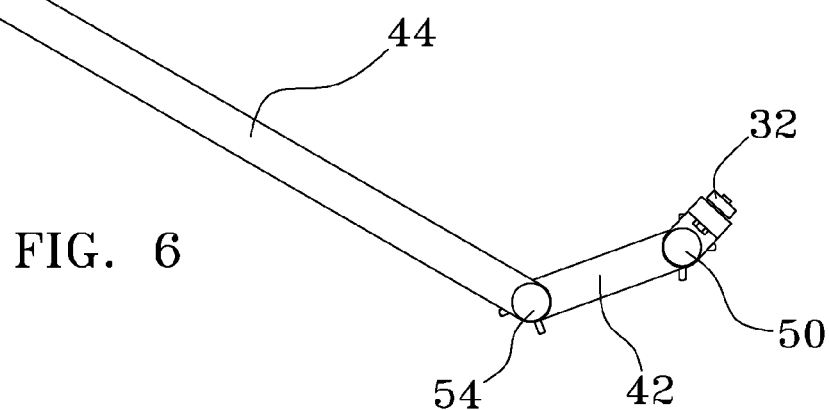
FIG. 4
FIG. 5
FIG. 6

TORSION SEAT-HANDLE TO FACILITATE LEARNING BICYCLE RIDING

BACKGROUND OF THE INVENTION

Learning to balance a bicycle while simultaneously steering and pedaling involves many attempts by the novice rider, with many of those attempts resulting in crashes. Several devices exist to aid the novice bicycle rider to stabilize the bicycle during the learning process.

In addition to the ubiquitous "training wheels," handle devices exist which assist is stabilizing a novice rider by allowing an instructor to hold the bicycle in an upright position. Such handle devices attach to the rear axle or the bike frame itself, and are often awkward. The instructor cannot alter the angular deployment of the handle device, and more importantly in use does not allow the novice rider to "feel" the instructor's corrections.

SUMMARY OF THE INVENTION

In accordance with the invention a torsion seat-handle is disclosed wherein the training device is mechanically affixed directly to the bicycle seat, thereby allowing the novice rider to receive physical feedback from the instructor through the bicycle seat itself. Hence, the rider can quickly respond to the movement of his/her seat and make the necessary adjustments to keep the bicycle in a balanced (i.e., upright) position. Unlike prior art, the present invention is not designed to "right" the bicycle, it simply does not generate the torque required to correct the bicycle to its upright position, but instead provides just enough torque to change the seat's position, providing a physical indication of the direction in which the rider needs to shift his/her weight in order to balance the bicycle. Informal studies have shown that the herein disclosed training device, through physical feedback, increases the speed as which a novice rider masters riding a bicycle. The brain actually learns the balanced position in a more expeditious manner.

The training device is adjustable at two connection points to account for differing heights of potential instructors, and account for different bike frame styles, bike seat sizes, and tire sizes.

BRIEF DESCRIPTION OF THE DRAWINGS

FIG. 4 is a side view of the torsion seat-handle is a first configuration;

FIG. 5 is a front exploded view of the torsion seat-handle;

FIG. 6 is a side view fo the torsion seat-handle is a second (alternate) configuration;

DETAILED DESCRIPTION

Figure 1:
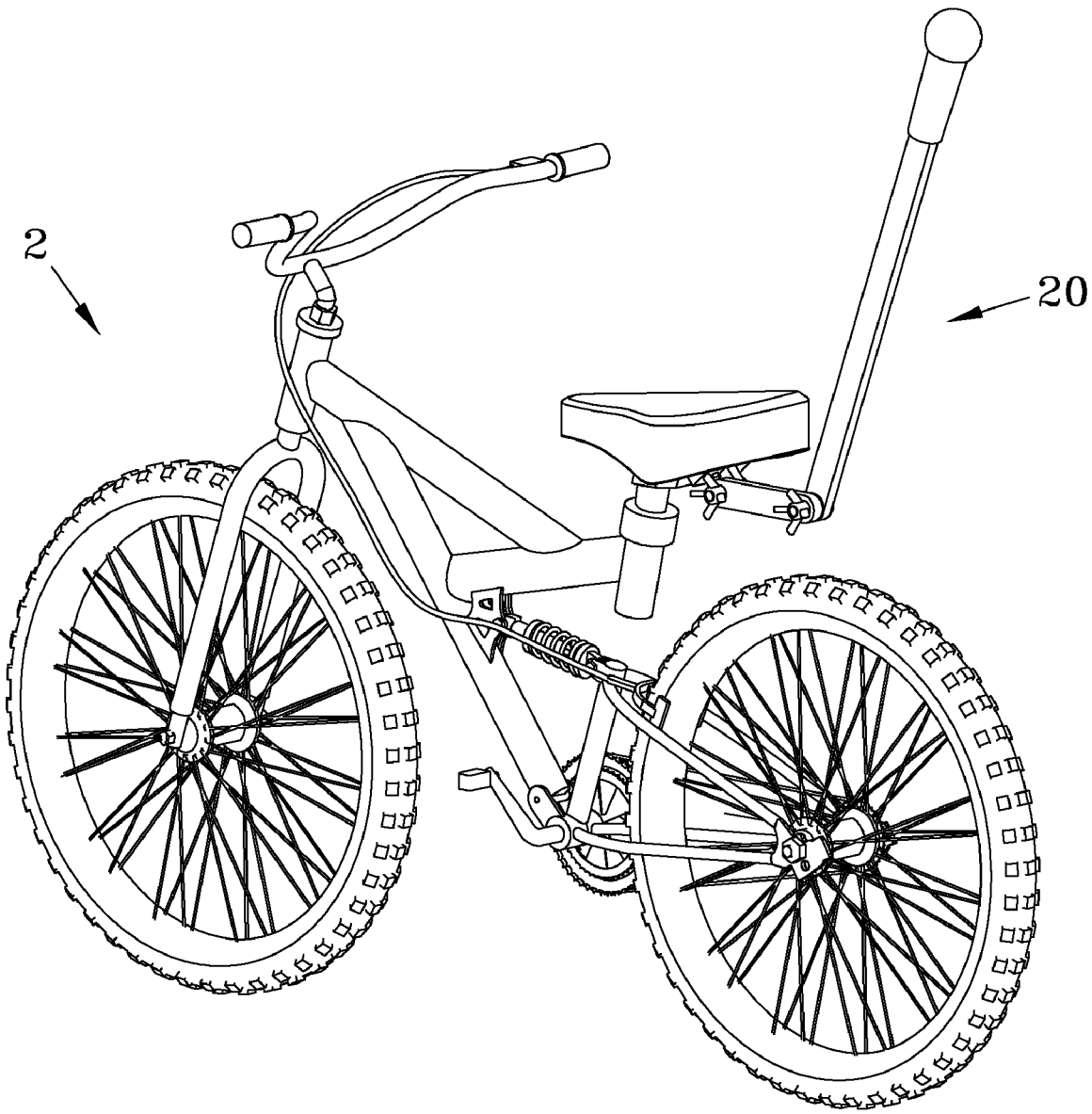
FIG. 1 is a perspective view of a bicycle with the torsion seat-handle mechanically affixed thereto.
Figure 2:
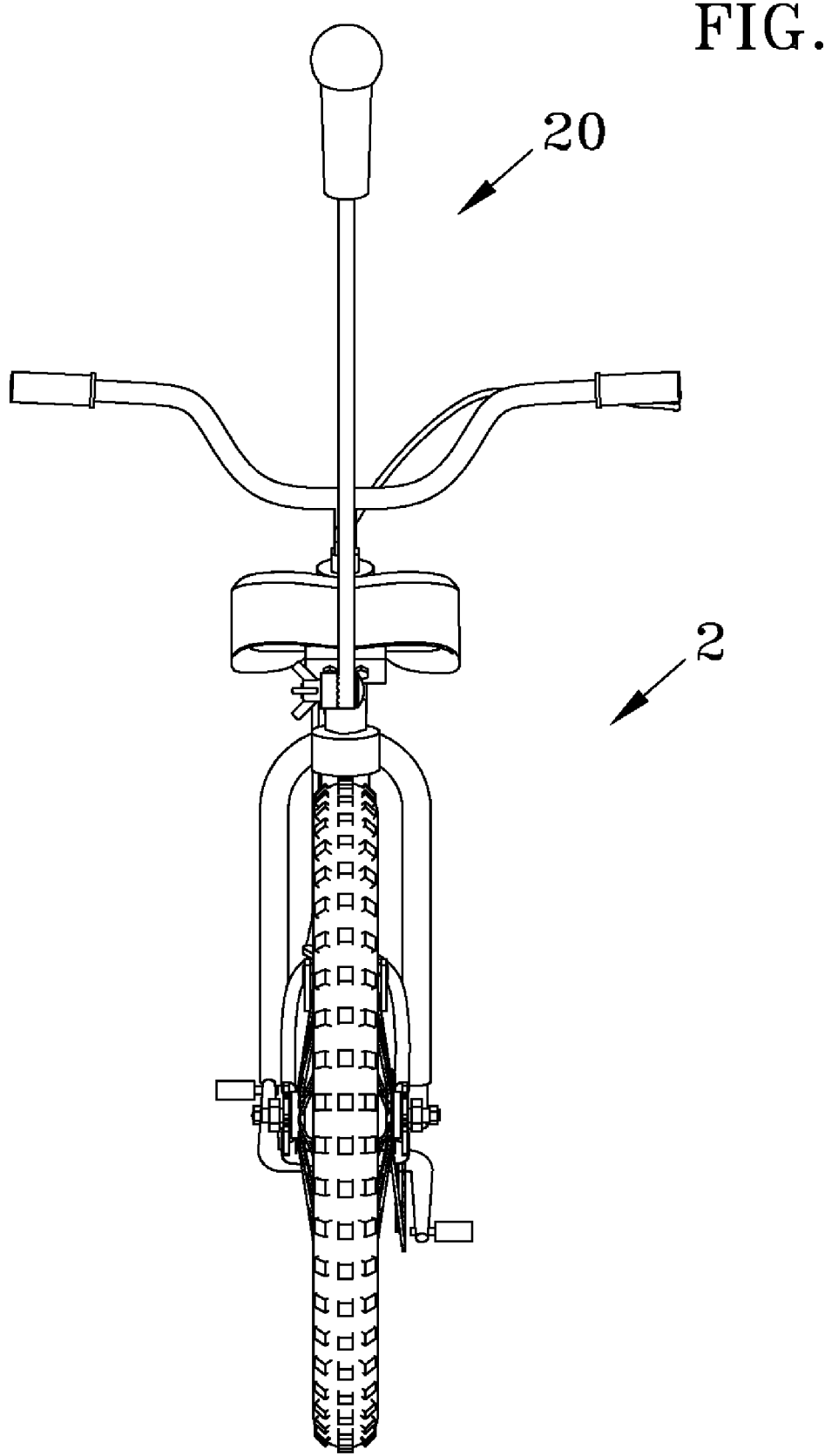
FIG. 2 is a rear view of a bicycle with the torsion seat-handle mechanically affixed thereto.
Figure 3:
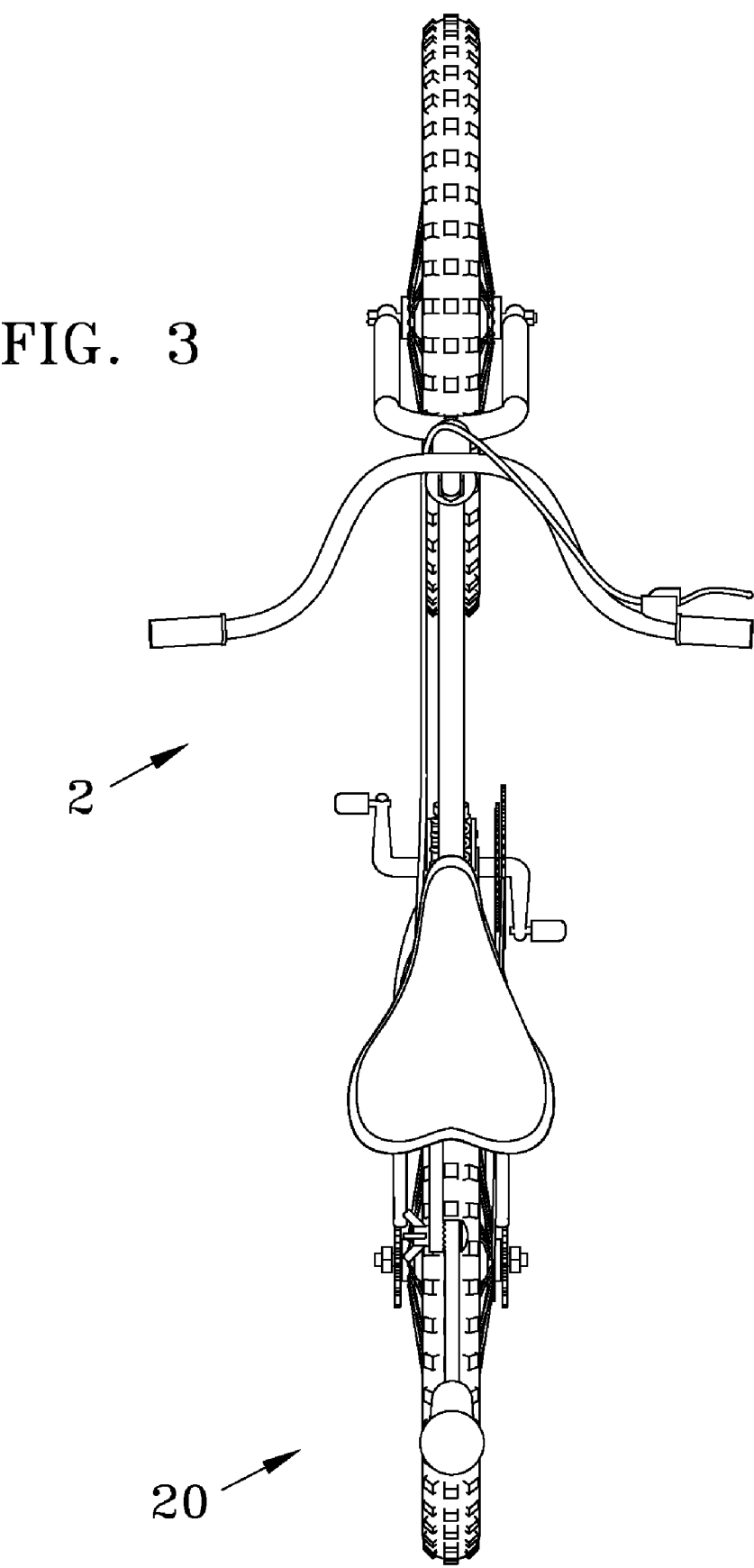
FIG. 3 is a top view of a bicycle with the torsion seat-handle mechanically affixed thereto.
Figure 7:
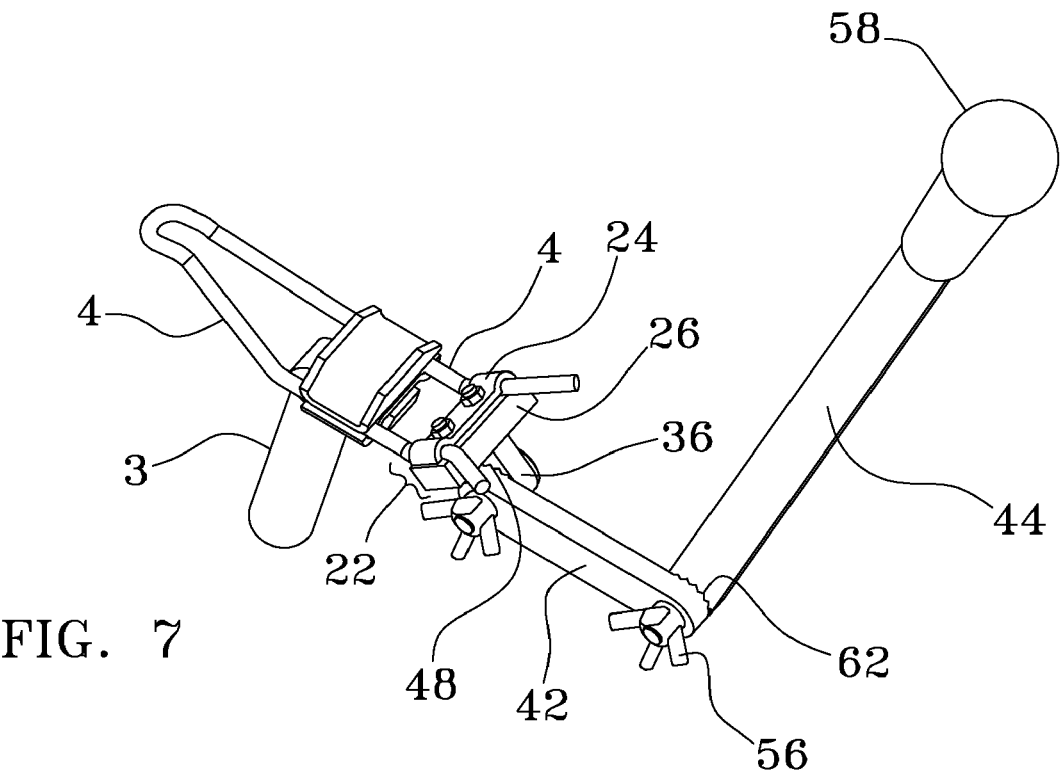
FIG. 7 is a top-side perspective view of the torsion seat-handle mechanically affixed to a bicycle seat support frame. For visual clarity the cushion part of the seat has been removed revealing just the tubular seat frame.
Figure 8:
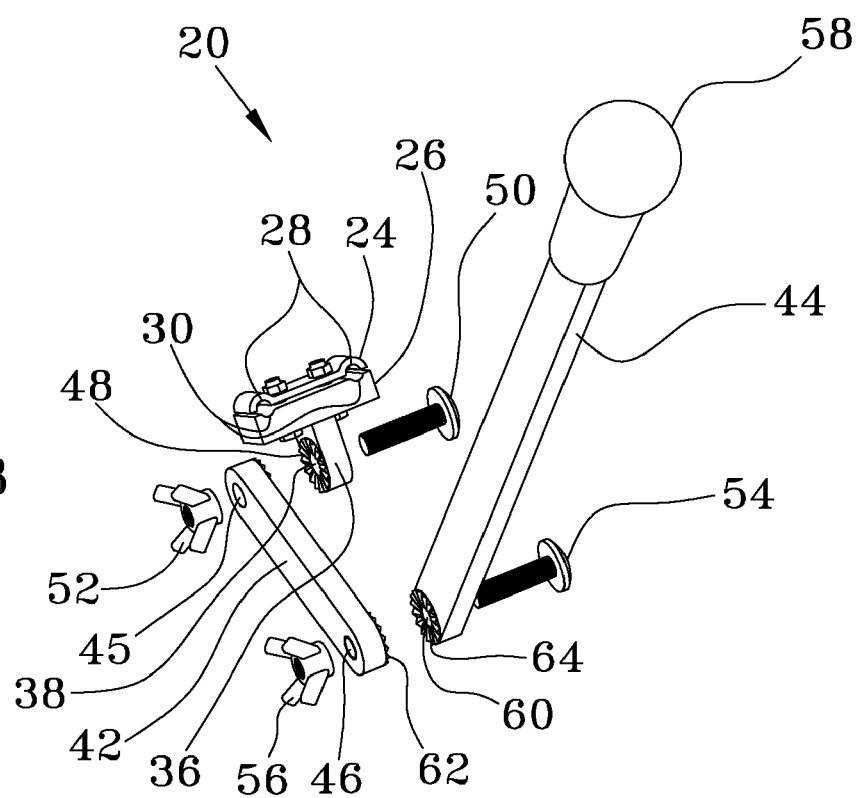
FIG. 8 is an exploded perspective view of the torsion seat-handle.

Referring to FIG. 1-3 an exemplary bicycle 2 is shown with the torsion seat handle 20 mechanically affixed thereon. Turning to FIGS. 7 & 8 the torsion seat-handle 20 can be seen in its entirety. Mounting bracket 22 is comprised of an upper jaw 24 and a lower jaw 26. Upper jaw 24 presents two longitudinal depressions 28 which open downwardly to cooperate with the two longitudinal depressions 30 of lower jaw 26, which open upwardly when jaws 24 and 26 engage seat support frame 4, which is mechanically fastened to seat post 3, such that seat support frame 4 is engaged between the jaws formed by the opposite depressions 28 and 30 as illustrated in FIG. 7.

To mechanically secure mounting bracket 22 to seat support frame 4, upper jaw 24 and lower jaw 26 present two vertical orifices (not visible) for receiving engagement bolts 32 which are secured with fastening nuts 34 as is well know in the art. See FIGS. 4-6.

Attachment boss 36 extends normally from lower jaw 26 and comprises an connection orifice 38 therethrough. Circumscribing connection orifice 38 is a serrated mating surface 40, which is well known in the art. Connection bar 42 connects mounting bracket 22 with handle 44. Connection bar 42 includes a bracket mounting aperture 44 at its proximate end and a handle mounting aperture 46 at its distal end. Serrated mating surface 40 of connection orifice 28 is designed to engage second serrated mating surface 48 which circumscribes bracket mounting aperture 45 allowing for the removable connection of mounting bracket 22 to connection bar 42 via connection bolt 50 and connection wingnut 52. See FIG. 5. Additionally, serrated mating surfaces 40 and 48 allow connection bar 42 to be positioned throughout a wide range of angles as is illustrated in FIGS. 4-6.

Handle 44 includes a bulbous portion 58 for providing easy gripping by an instructor at its distal end and a locking aperture 60 at its proximate end. Handle mounting aperture 46 is circumscribed by a third serrated mating surface 62 to matingly engage the fourth serrated mating surface 64 which circumscribes locking aperture 60, allowing for the removable connection of the handle 44 to the connection bar 42 via handle bolt 54 and handle wingnut 56. Serrated mating surfaces 62 and 64 allow handle 44 to be positioned throughout a wide range of angles as is illustrated in FIGS. 4 & 5.

In use, the instructor attaches the mounting bracket 22 to the seat support frame 4 of the bicycle 2. The instructor then tightens fastening nuts 34 about engagement bolts 32 until mounting bracket 22 is immovably attached about the seat support frame 4. The instructor then attaches the connection bar 42 at the desired angle to mounting bracket 22 via connection bolt 50 and tightening connection wingnut 52 until connection bar 42 is immovably attached to mounting bracket 22. Finally, the instructor attaches handle 44 to connection bar 42 via connection bolt 54 and tightening handle wingnut 56 until handle 44 is immovably attached about connection bar 42. When utilized to train a novice bicycle rider to ride a bicycle 2, the instructor simply follows behind the bicycle 2 while balancing the bicycle 2 with the torsion seat-handle 20, making the appropriate corrections to maintain the vertical orientation of the bike. Because the corrective forces applied through the torsion seat-handle are directly applied to the frame of the bicycle seat (rather than to the bike frame), and due to the seat frame's ability to flex and move, the amount of movement incurred at the seat exceeds the amount of movement that would be incurred by seat (and hence the bicycle rider) if a similar handle were attached to the bike frame. The novice rider receives immediate physical feedback through his/her buttocks. That is, he/she feels the adjustments the instructor makes via the torsion seat-handle. Having this physical sensation associated with each correction allows the novice rider's brain to more quickly assimilate the physical sensation of the instructor's correction with learning the "balanced" position required for bicycle riding.

We claim:

1. A seat torsioning device for direct connection to a flexible bicycle seat support frame comprising:
    a mounting bracket;
    an adjustable connection bar; and
    an adjustable torque imparting handle;
    wherein the mounting bracket is mechanically affixed to said flexible bicycle seat support frame;
    said adjustable connection bar is mechanically affixed to said mounting bracket; and said adjustable handle is mechanically affixed to said adjustable connection bar, wherein said mounting bracket and said bicycle seat support frame are free to flex independently with respect to a frame of a bicycle that said mounting bracket and said bicycle seat support frame are mounted when torque is imparted from said torque imparting handle through said connection bar to said seat mounting bracket and the affixed said bicycle seat support frame;
    wherein said mounting bracket further comprises:
    an upper jaw wherein said upper jaw comprises two downwardly opening longitudinal depressions; and
    a lower jaw wherein said lower jaw comprises two upwardly opening longitudinal depressions that matingly conform to said downwardly opening depressions; and
    wherein said seat support frame is engaged between said upper jaw and said lower jaw.

2. The seat torsioning device of claim 1 wherein said mounting bracket is mechanically fasted to said seat support frame by a least one nut and bolt assembly.

3. The seat torsioning device of claim 2 wherein said mounting bracket further comprises an attachment boss extending normally from said lower jaw and comprises at least one connection orifice.

4. The seat torsioning device of claim 3 wherein said connection orifice is circumscribed with a serrated mating surface.

5. The seat torsioning device of claim 4 wherein said connection bar comprises a bracket mounting aperture at its proximate end and a handle mounting aperture at its distal end; and wherein a second serrated mating surface surrounds said bracket mounting aperture;
    wherein said serrated mating surface of connection orifice is designed to engage second serrated mating surface of said bracket mounting aperture allowing for the removable connection of said mounting bracket to said connection bar via a connection bolt and wingnut assembly.

6. The seat torsioning device of claim 5 wherein said handle comprises a bulbous portion at a distal end and a locking aperture at a proximate end;
    wherein said handle mounting aperture is circumscribed by a third serrated mating surface to matingly engage the fourth serrated mating surface which circumscribes said locking aperture, allowing for the removable connection of said handle to said connection bar via handle bolt and wingnut assembly.

* * * * *